W. W. CROSWELLER.
INSTRUMENT FOR RECORDING PERCENTAGE VOLUMES OF CONSTITUENT GASES.
APPLICATION FILED MAR. 27, 1916.
1,229,587.
Patented June 12, 1917.
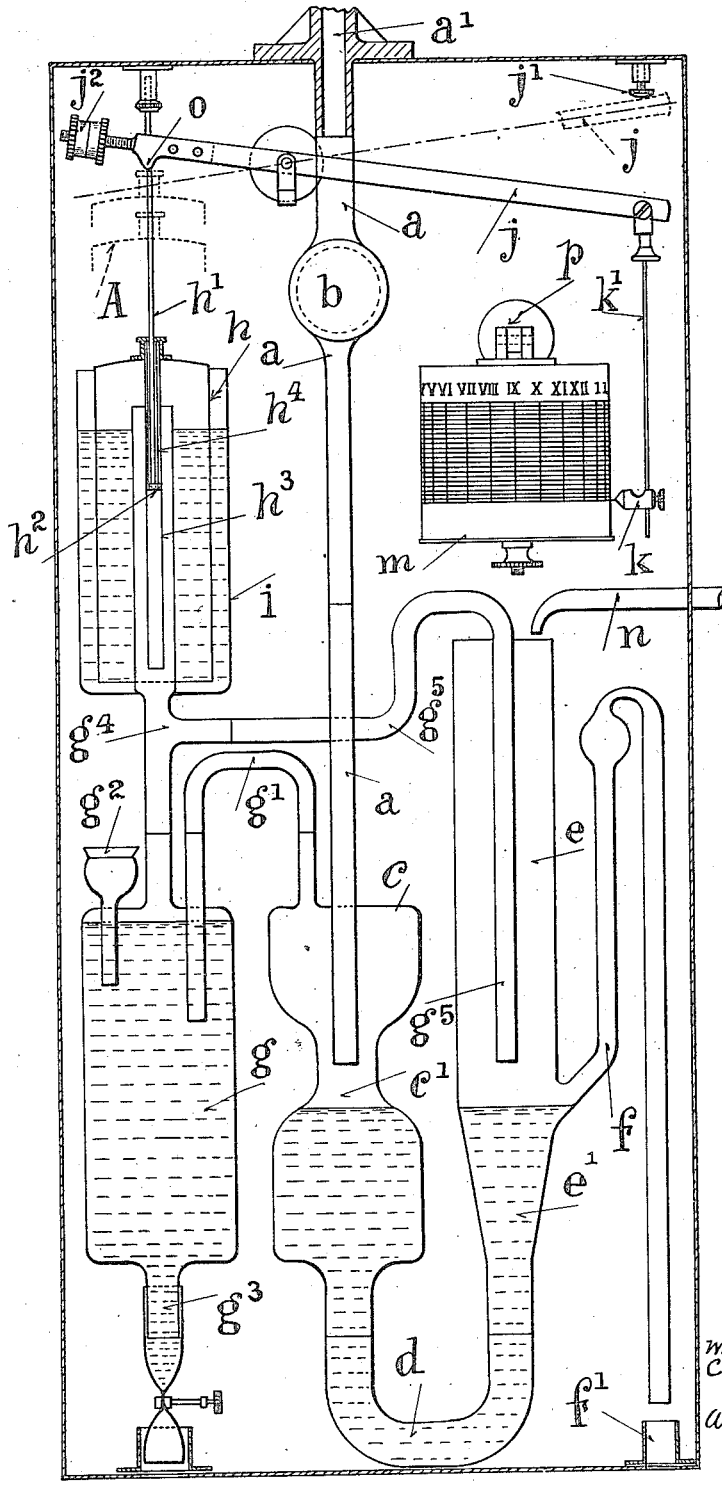
Inventor
Walter William
Crosweller
By
Wm Wallace Whit
Attorney.

UNITED STATES PATENT OFFICE.

WALTER WILLIAM CROSWELLER, OF CRUMPSALL, MANCHESTER, ENGLAND.

INSTRUMENT FOR RECORDING PERCENTAGE VOLUMES OF CONSTITUENT GASES.

1,229,587.         Specification of Letters Patent.         Patented June 12, 1917.

Application filed March 27, 1916. Serial No. 86,912.

*To all whom it may concern:*

Be it known that I, WALTER WILLIAM CROSWELLER, a subject of the King of Great Britain and Ireland, residing at Mapledene, Kearsley Road, Crumpsall, Manchester, in the county of Lancaster, England, engineer, have invented new and useful Improvements in Instruments for Recording Percentage Volumes of Constituent Gases, of which the following is a specification.

The invention relates to an improved instrument for use in recording percentage volumes of constituent gases, which instrument is particularly applicable as a carbon di-oxid ($CO_2$) recorder. My object has been to design a simplified and effective instrument with a minimum of component parts as compared with known instruments for this purpose, reducing the cost of manufacture and maintenance, and minimizing the liability to get out of order. An instrument made in accordance with my invention possesses a power vessel operated by water head, and a gas burette, so arranged in relation to the power vessel and a siphon used for draining off water from the power vessel, that the gas burette will always hold a quantity of water which will become charged with any gas which is soluble in water. The power vessel is in direct communication with the gas burette, without intervening air lock, or any controlling means or mechanism, governing such communication. Also in my improved instrument the exact adjusting of the volume of gas to be measured and the ultimate drainage of this gas sample, is effected by the medium of a single tube sealed directly by the rising of the water in the power vessel. These features necessitate the employment of only three vessels, viz. the power vessel, the gas burette, and the absorption vessel, apart from a float vessel and float and the usual pen gear, clockwork drum and recording chart.

I will describe now more particularly, referring to the accompanying drawing, the construction of my improved instrument as it would be made for a $CO_2$ recorder.

An inlet pipe $a$ for the flue gases, having a suitable filter $b$ on any convenient part thereof, dips into a gas burette $c$, which burette is formed with a contracted waist at $c'$ at about the end of the pipe $a$, and below the end of this pipe, is made of comparatively large dimensions to contain a volume of water somewhat greater than the volume of the gas sample. The filter vessel $b$ is filled with glass wool, cotton wool, or the like and the outer gas sampling pipe connected to the inlet pipe $a$ is or may be provided with a suitable filter. The outer gas sampling pipe will be connected to the pipe $a$ by means of a T piece partly indicated at $a'$. A branch $d$ connects the lower end of the gas burette $c$ directly to the bottom of a power vessel $e$, the bottom of the latter vessel being tapered at $e'$ to connect with such branch. The power vessel is provided with a siphon $f$ to drain off a definite quantity of the water, when the water reaches a certain level in the vessel. An absorption vessel $g$, containing a solution of caustic potash (sp. gr. about 1.27) is in communication with the top of the gas burette by means of a tube $g'$, one end of which dips into the caustic potash, the absorption vessel having also a filling funnel $g^2$ and discharge outlet $g^3$ which outlet may be closed by a short piece of rubber tube and a screw-clip as shown. The absorption vessel $g$ also communicates by means of a tube $g^4$, open at the top, with the interior of a cylindrical float $h$ contained in a suitable float vessel $i$ and sealed in pure paraffin (sp. gr. about 0.86) or any other suitable liquid, the float $h$ being guided to work vertically upon a fixed spindle $h'$. The float $h$ is guided upon a head $h^2$ on the end of the spindle $h'$ by means of a tube $h^3$ secured to the head of the float $h$. Within the tube $h^3$ is a shorter sleeve $h^4$ limiting the fall of the float $h$, the end of the sleeve coming into contact with the head $h^2$. This is shown in section in the drawing the float being indicated in its lowest position. The tube $g^4$ connecting the absorption vessel $g$ and float $h$ is provided with a branch $g^5$ dipping into the power vessel $e$, this branch serving to drain off the gas sample after the test has been made and recorded. This branch pipe $g^5$ may be made adjustable to regulate the level of the outlet of such pipe in the power vessel. Above the float is one end of a pivoted loaded lever $j$, the other end of such lever carrying the ordinary pen marking device $k$ working in conjunction with a chart on a clockwork actuated drum $m$ of the usual description. In the lowest position of the float $h$ the lever $j$ is in position shown by the dotted center line, the correct position of the pivoted lever being determined by an adjustable stop $j'$, the load $j^2$ being adjusted to press the end of the lever lightly against the stop. The pen nib $k$ is then adjusted on the rod $k'$ so that it points to the top line on the chart. As shown in full lines in the drawing the lever $j$ has been rocked into the position it would be caused to assume by the float at the full height of its travel. In this position the pen has been traversed downward to its full extent across the chart on the drum and points to the bottom or zero line on the chart.

The action of the recorder is as follows:

The power vessel $e$ and gas burette $c$ contain when the apparatus is not at work a definite quantity of water at equal level, as shown in the drawing, such level being below the discharge orifices of the gas inlet pipe $a$ in the burette and the gas outlet pipe $g^5$ in the power vessel which charge of water in the gas burette at least becomes saturated, during the working of the apparatus, with $CO_2$, and which charge of saturated water, contained always in the gas burette, is a novel and important feature of my invention.

Water from any suitable source is discharged in a fine stream through the pipe $n$ into the power vessel $e$ raising the level in it and also in the burette until the orifices of the gas inlet pipe $a$ in the burette and the gas outlet pipe $g^5$ in the power vessel are immersed in the water. When the water reaches a certain level the siphon $f$ comes into action to drain off the water admitted, via the drain pipe $f'$, at a much greater rate than the rate of flow into the power vessel and the water in the burette $c$ and power vessel $e$ falls to its normal level, which level is below the end of the gas inlet pipe $a$ and thus a sample or charge of the flue gas is inspired into the upper part of the gas burette. On the water again rising in the burette and power vessel the orifices of the gas inlet pipe $a$ and the gas outlet pipe $g^5$ in the power vessel are closed by the rising water and the flue gas sample is forced into the absorbing solution in the absorption vessel $g$, the carbon di-oxid in the gas being absorbed by the caustic potash therein. The rest of the sample is forced out of the absorption vessel $g$ into the hollow float $h$ being discharged against the underside of the head of the float, above the level of the paraffin, thus raising the float. In the particular application of this invention as a $CO_2$ recorder and in connection with boiler plants requiring a recording chart of 20%, just 80% of the movement of the float is lost motion, the extent of this lost motion being represented by the dotted line A. At this point the head of the float comes into contact with the end of the pivoted lever, or part $o$ or abutment formed thereon or attached thereto, or an anti-friction bowl, the lever being actuated and the recorder pen traversed downward on the chart, the percentage of $CO_2$ absorbed being indicated on the chart. The siphon then again discharges water from the power vessel as described and the water level in it and the burette rapidly falls to the normal. This not only inspires a fresh sample of flue gas into the burette for analysis, but also permits the float $h$ to fall to its lowest level, forcing out the gas sample just tested down the pipe $g^4$ within the float, and by way of the branch pipe $g^5$ into the power vessel $e$ from which it can escape owing to the level of the water in the vessel being then below the discharge orifice of such pipe $g^5$.

The instrument is to be adjusted on air which, containing no $CO_2$, will all pass through the absorbing solution to the float causing this to perform its maximum travel, and the pen to travel right down the chart to the zero line at the bottom. In working, the $CO_2$ is absorbed, causing the float to travel less and the pen to stop short of its full travel and on a line indicating the exact percentage volume of $CO_2$. The flow of water into the power vessel is arranged to be regulated by a suitable tap or valve, and by such regulation any desired number of analyses to the hour can be obtained, such analyses being recorded so long as water is allowed to flow into the power vessel.

The separate glass tubes used in the apparatus will be joined by rubber tubing.

To facilitate the emptying of the vessels and more particularly for portable models, short tubes not shown may be formed on the bottom of the float vessel and the connection from the power vessel to the gas burette. These tubes would be closed at the ends by pieces of rubber tubing and small screw-clips. The clockwork can be inclined forward on the knuckle joint $p$ so that the drum can be removed and the chart changed. At the same time the clock proper can be rewound by revolving it by hand or by other device as known in these types of clocks.

I may find it desirable or necessary to float a certain volume of a light oil such as paraffin upon the surface of the water in the gas burette. The various vessels and tubes are made of glass, but any suitable material may be used in their construction and the parts of the instrument are inclosed in a suitable case, with glazed doors for inspection purposes and for affording access to the mechanism.

In order that the gas analyzed shall be of very recent manufacture, i. e. to reduce the "time-lag" of the instrument as much as possible, a form of aspirator or gas pump or similar contrivance may be used outside the instrument in accordance with usual practice. This would be connected to the T piece at the top of the recorder, and so would induce a flow of gas across the recorder inlet through which the required samples will be drawn by the action of the burette as described.

The instrument may be used as a recorder for other gases than carbon di-oxid, the absorption vessel in such cases being filled with an appropriate chemical solution.

I declare that what I claim is.

1. In a gas analyzing and recording instrument a gas burette, a power vessel connected directly by a branch to the gas burette and a siphon arranged with its inlet end within the power vessel so as to constantly leave a charge of water in the gas burette and power vessel below such inlet end substantially as described.

2. In a gas analyzing and recording instrument, a gas burette formed with a restricted waist, means to conduct the gas to the burette, a power vessel actuated by water head, and connected directly by a branch to the gas burette, means to conduct a fine stream of water to the power vessel, and means to intermittently siphon off a portion only of the contents of the gas burette and power vessel substantially as described.

3. In a gas analyzing and recording instrument, a gas burette, means for alternately inspiring and expelling gas samples into and out of such burette, means to enable the gas burette to hold constantly a quantity of water charged with soluble gas, and an absorption vessel into which the whole of the gas sample is passed substantially as described.

4. A gas analyzing and recording instrument consisting of a gas burette, a water power vessel, means governed by the water power vessel, for alternately inspiring and expelling gas samples, into and out of such gas burette, means to enable the gas burette to hold constantly a quantity of water charged with soluble gas, an absorption vessel communicating with the gas burette, a float chamber in communication with the absorption vessel and with the power vessel, a float in the float chamber, a pivoted lever one end of which is actuated by the float, a pen recording device carried on the other end of the pivoted lever, and a clockwork drum to carry a chart on which the results of the analyses are recorded substantially as described.

In testimony whereof I have signed my name to this specification in the presence of two subscribing witnesses.

WALTER WILLIAM CROSWELLER.

Witnesses:
JOSHUA ENTWISLE,
ALFRED STUART YATES.